(12) United States Patent
Fan et al.

(10) Patent No.: US 10,002,434 B2
(45) Date of Patent: Jun. 19, 2018

(54) DOCUMENT REGION DETECTION

(71) Applicant: Hewlett-Packard Development Company, L.P., Houston, TX (US)

(72) Inventors: Jian Fan, San Jose, CA (US); Su Wang, Palo Alto, CA (US); Daniel R Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/500,573

(22) PCT Filed: Jul. 31, 2014

(86) PCT No.: PCT/US2014/049257
§ 371 (c)(1),
(2) Date: Jan. 31, 2017

(87) PCT Pub. No.: WO2016/018395
PCT Pub. Date: Feb. 4, 2016

(65) Prior Publication Data
US 2017/0221213 A1    Aug. 3, 2017

(51) Int. Cl.
*G06T 7/12*    (2017.01)
*G06K 9/00*    (2006.01)
(Continued)

(52) U.S. Cl.
CPC ............ *G06T 7/12* (2017.01); *G06K 9/00463* (2013.01); *G06T 3/403* (2013.01); *G06T 5/002* (2013.01);
(Continued)

(58) Field of Classification Search
CPC .. G06T 7/12; G06T 7/13; G06T 3/403; G06T 5/002; G06T 5/50; G06K 9/00463
See application file for complete search history.

(56) References Cited

U.S. PATENT DOCUMENTS 7,463,772 B1 * 12/2008 Lefevere .............. G06K 9/3283
345/419
7,599,561 B2    10/2009 Wilson et al.
(Continued)

FOREIGN PATENT DOCUMENTS

JP      2011-198270 A    10/2011
WO    WO-2006/017233 A1    2/2006

OTHER PUBLICATIONS

Dimitriou et al., "Detertion and Classification of Multiple Objects using an RGB-D Sensor and Linear Spatial Pyramid Matching," Electronic Letters on Computer Vision and Image Analysys 12(2): 78-87, Mar. 4, 2013.

(Continued)

*Primary Examiner* — David F Dunphy
(74) *Attorney, Agent, or Firm* — Dicke, Billig & Czaja, PLLC

(57) ABSTRACT

One example provides a system. The system receives an infrared image and processes the infrared image to detect lines in the infrared image. The system receives a color image corresponding to the infrared image and processes the color image to detect lines in the color image. The detected lines in the infrared image and the detected lines in the color image are combined. A document region is detected from the combined detected lines.

15 Claims, 7 Drawing Sheets

(51) Int. Cl.
*G06T 5/00* (2006.01)
*G06T 5/50* (2006.01)
*G06T 7/13* (2017.01)
*G06T 3/40* (2006.01)

(52) U.S. Cl.
CPC ............... *G06T 5/50* (2013.01); *G06T 7/13* (2017.01); *G06T 2207/10024* (2013.01); *G06T 2207/10048* (2013.01); *G06T 2207/20221* (2013.01); *G06T 2207/30176* (2013.01)

(56) References Cited

U.S. PATENT DOCUMENTS

| | | | |
|---|---|---|---|
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,433,133 B2 | 4/2013 | Guerzhoy et al. | |
| 8,565,547 B2 | 10/2013 | Strandemar | |
| 8,631,922 B2 | 1/2014 | Stone et al. | |
| 8,693,731 B2 | 4/2014 | Holz et al. | |
| 8,704,896 B2 | 4/2014 | Nijemcevic et al. | |
| 8,736,583 B2 | 5/2014 | Anderson et al. | |
| 9,609,164 B2* | 3/2017 | Chen | H04N 1/04 |
| 2002/0048411 A1* | 4/2002 | Takayama | G06K 9/40 382/275 |
| 2004/0081332 A1* | 4/2004 | Tuttle | G06K 9/00442 382/100 |
| 2005/0040333 A1 | 2/2005 | Fleury et al. | |
| 2005/0078092 A1 | 4/2005 | Clapper | |
| 2008/0018591 A1 | 1/2008 | Pittel et al. | |
| 2010/0195918 A1* | 8/2010 | Yonezawa | G07D 7/2016 382/218 |
| 2010/0258629 A1* | 10/2010 | Huang | G06K 9/2018 235/449 |
| 2011/0242054 A1 | 10/2011 | Tsu | |
| 2011/0262053 A1* | 10/2011 | Strandemar | G06K 9/6289 382/263 |
| 2013/0077236 A1 | 3/2013 | Becze et al. | |
| 2013/0121594 A1 | 5/2013 | Kawatani et al. | |
| 2013/0121595 A1* | 5/2013 | Kawatani | G06K 9/00449 382/199 |
| 2014/0340515 A1* | 11/2014 | Tanaka | G06T 5/003 348/143 |
| 2015/0269742 A1* | 9/2015 | Bergstrom | H04N 5/332 348/164 |

OTHER PUBLICATIONS

Shahram Izadi et al., "C-Slate: A Multi-Touch and Object Recognition System for Remote Collaboration using Horizonta Surfaces," pp. 3-10, IEEE.

Susstrunk et al., "Automatic Skin Enhancement with Visible and Near-Infrared Image Fusion," MM'10, Oct. 25-29, 2010, pp. 1-4, ACM.

Yang et al—"Region based Color Fusion Method for Visible and IR image Sequences" IEEE—2008—6 pages.

\* cited by examiner

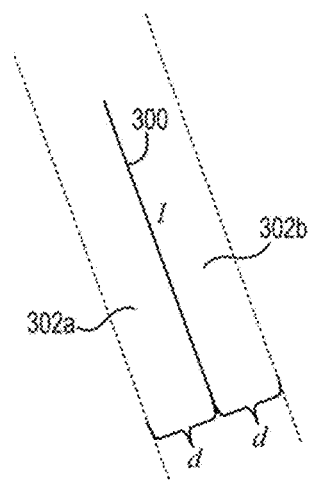
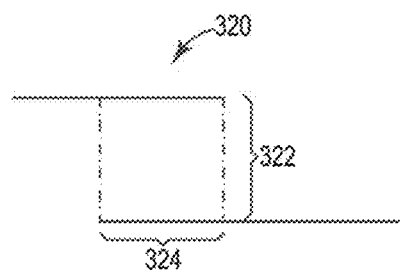
Fig. 3
Fig. 4
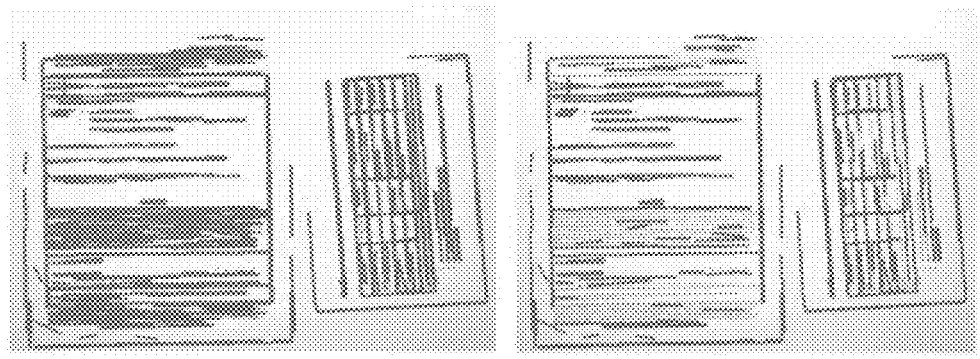
Fig. 5A
Fig. 5B

DOCUMENT REGION DETECTION

BACKGROUND

Images of documents may be captured for a variety of applications, such as camera-projector systems, document scanning systems, and text and/or image recognition systems. When capturing an image of a document, the image may include portions that are not part of the document.

BRIEF DESCRIPTION OF THE DRAWINGS

FIG. 3 is a diagram of a line for illustrating one example of a method for removing crowded lines.

FIG. 4 is a diagram illustrating one example of the overlap and distance between two substantially parallel lines.

FIG. 5A is a diagram illustrating one example of detected lines in an image prior to a clean-up process.

FIG. 5B is a diagram illustrating one example of detected lines in an image after a clean-up process.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Examples of the disclosure provide an image processing system for detecting document regions within an image. The system captures an infrared image and a color image of a document or documents. The infrared image is substantially spatially registered with the color image. The infrared image and the color image are each processed to detect lines. The detected lines from both images are then combined and processed to identify quadrilaterals. The quadrilaterals are then processed and evaluated to determine document regions.

Figure 1:
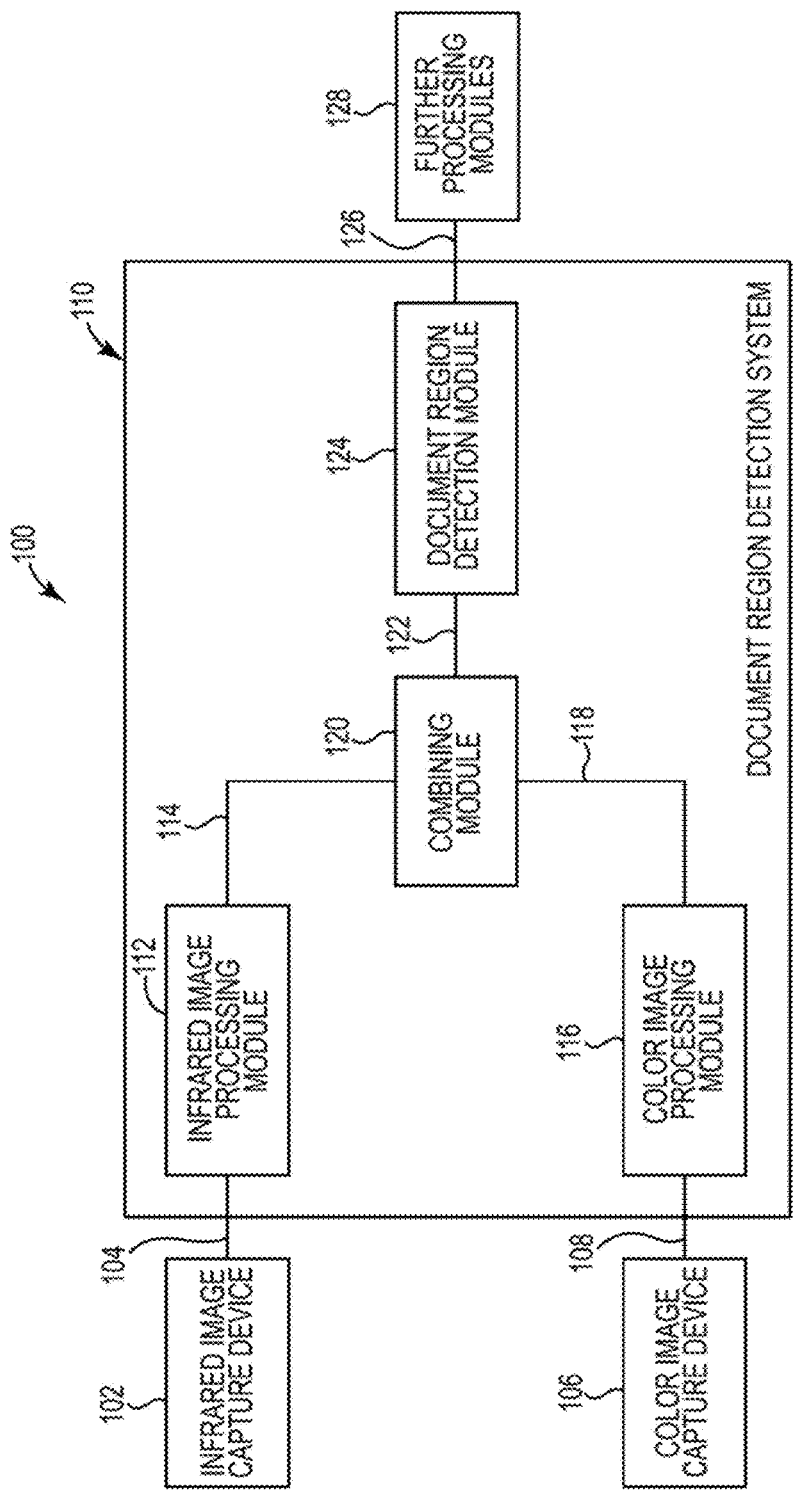
FIG. 1 is a block diagram illustrating one example of a system for document region detection.

FIG. 1 is a block diagram illustrating one example of a system 100 for document region detection. System 100 includes an infrared image capture device 102, a color image capture device 106, a document region detection system 110, and further processing modules 128. Document region detection system 110 includes an infrared image processing module 112, a color image processing module 116, a combining module 120, and a document region detection module 124.

Infrared image capture device 102 is communicatively coupled to infrared image processing module 112 through a communication link 104. Infrared image processing module 112 is communicatively coupled to combining module 120 through a communication link 114. Color image capture device 106 is communicatively coupled to color image processing module 116 through a communication link 108. Color image processing module 116 is communicatively coupled to combining module 120 through a communication link 118. Combining module 120 is communicatively coupled to document region detection module 124 through a communication link 122. Document region detection module 124 is communicatively coupled to further processing modules 128 through a communication link 126.

Infrared image capture device 102 captures an infrared image of one or more documents for processing. Infrared image capture device 102 includes a Charge-Coupled Device (CCD) sensor, Complementary Metal-Oxide Semiconductor (CMOS) sensor, or other suitable image sensor. Color image capture device 106 captures a color image of the one or more documents for processing. In one example, color image capture device 106 captures a Red Green Blue (RGB) image. Color image capture device 106 includes a CCD sensor, a CMOS sensor, or other suitable image sensor. The infrared image captured by infrared image capture device 102 is substantially spatially registered to the color image captured by color image capture device 106. In one example, the infrared image is spatially registered to the color image with a small error within several pixels.

Infrared image processing module 112 receives the infrared image from infrared image capture device 102 through communication link 104. As will be described in more detail below with reference to the following figures, infrared image processing module 112 filters noise, detects edges, detects lines, and adjusts the scale of detected lines of the infrared image. Color image processing module 116 receives the color image from color image capture device 106 through communication link 108. As will be described in more detail below with reference to the following figures, color image processing module 116 filters noise, detects edges, detects lines, and cleans the detected lines of the color image.

Combining module 120 receives a list of detected lines from infrared image processing module 112 for the infrared image through communication link 114 and a list of detected lines from color image processing module 116 for the color image through communication link 118. Combining module 120 combines the list of detected lines for the infrared image with the list of detected lines for the color image into a single list. In one example, each detected line in the single list may carry a flag of "infrared" or "color" indicating the source image from which the line was detected. Combining module 120 may also sort the single list of detected lines by length.

Document region detection module 124 receives the list of detected lines from combining module 120 through communication link 122. As will be described in more detail below with reference to the following figures, document region detection module 124 identifies eligible lines pairs, evaluates the eligible line pairs to detect quadrilaterals, evaluates the quadrilaterals, and selects quadrilaterals corresponding to document regions.

Further processing modules 128 receive the detected document regions from document region detection module 124 through communication link 126. Further processing modules 128 may include correction modules for eliminating distortion, image and/or text recognition modules, or other suitable modules for analyzing and/or using the detected document regions.

Figure 2:
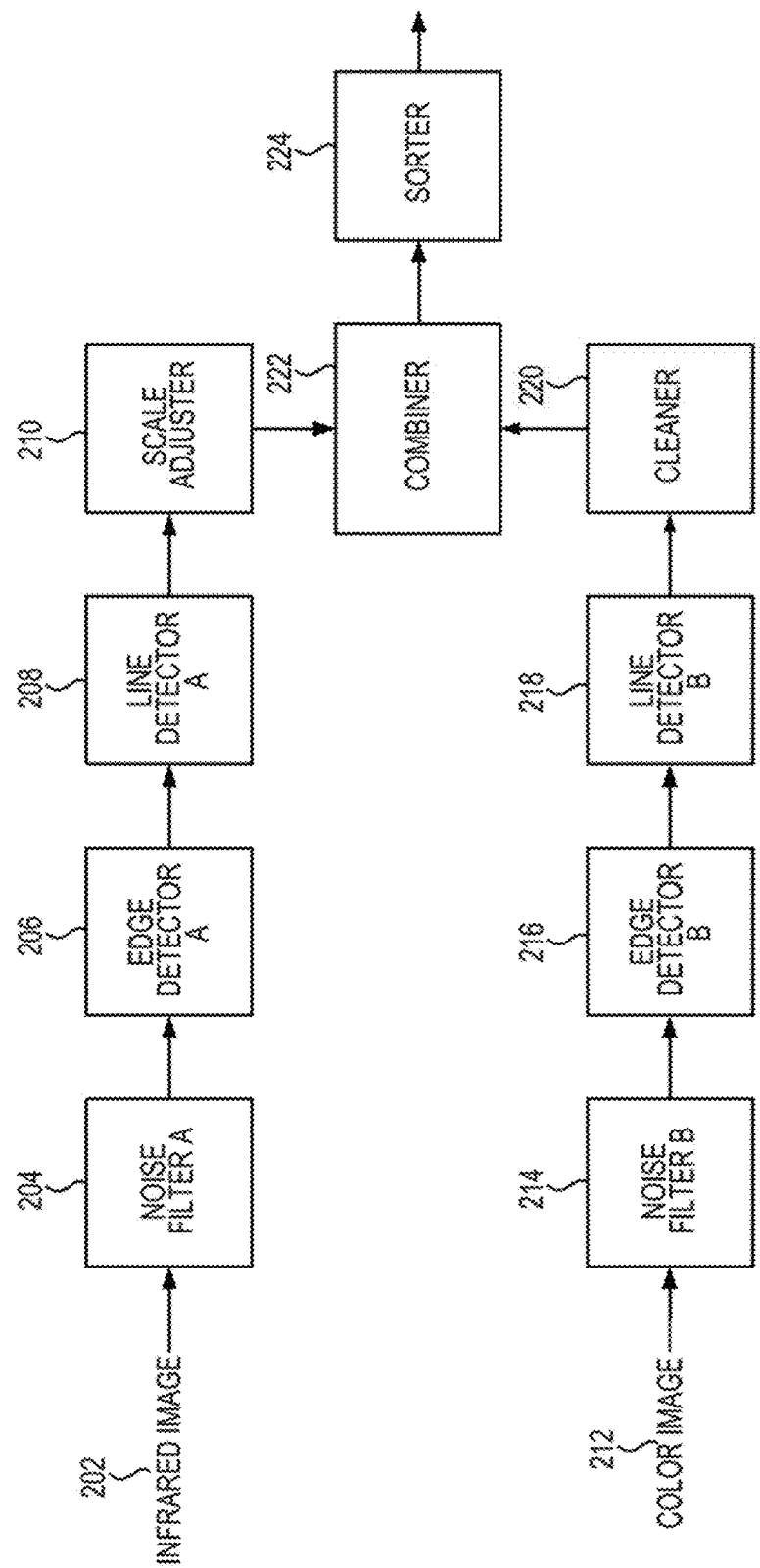
FIG. 2 is a functional block diagram illustrating one example of an infrared image processing module and a color image processing module.

FIG. 2 is a functional block diagram illustrating one example of an infrared image processing module and a color image processing module. In one example, infrared image processing module 112 (FIG. 1) includes noise filter A 204, edge detector A 206, line detector A 208, and scale adjuster 210. In one example, color image processing, module 116 (FIG. 1) includes noise filter B 214, edge detector B 216, line detector B 218, and cleaner 220. In one example, combining module 120 (FIG. 1) includes combiner 222 and sorter 224.

Noise filter A 204 receives an infrared image 202. In one example, infrared images are significantly noisier than color images. Noise filter A 204 may include an edge preserving fitter, such as a bilateral filter, followed by a Gaussian filter. In other examples, noise filter A 204 may include other suitable filters. Edge detector A 206 receives the filtered infrared image from noise filter A 204. Since infrared images have only one channel, edge detector A 206 may include a Canny edge detector. In other examples, edge detector A 206 may include other suitable edge detectors.

Line detector A 208 receives the detected edge information from edge detector A 206. Line detector A 208 may include a Hough transform based method for line detection. In other examples, line detector A 208 may include other suitable methods for line detection. Scale adjuster 210 receives the detected line information from line detector A 208. Since the image resolution of infrared images is often lower than that of color images, lines detected from infrared images may be upscaled to the same scale of the color images by scale adjuster 210.

Noise filter B 214 receives a color image 212. In one example, noise filter B 214 may include an edge preserving filter with a smaller window size than Noise filter A 204. Noise filter B 214 may include a Gaussian filter. In other examples, noise filter B 214 may include other suitable filters. Edge detector 216 receives the filtered color image from noise filter B 214. Edge detector B 216 may include a color edge detector. Line detector B 218 receives the detected edge information from edge detector B 216. Line detector B 218 may use an edge following method for line detection or another suitable method.

Cleaner 220 receives the detected line information from line detector B 218. Cleaner 220 removes lines deemed not to be part of document borders. The cleaning method is based on the observation that documents have significant blank margin areas. Therefore, if a line is a document border, at least one side of the line is not crowded by other lines substantially parallel to the line. As illustrated in FIG. 3, a line l 300 divides the two dimensional space into two parts. The space 302a and 302b on either side of line l having a distance to line l of no more than a given distance threshold d is considered. The number of lines within the two spaces 302a and 302b are counted separately.

A line is considered to be within the space 302a or 302b if the line meets the following three criteria:

1) The overlap of the line and the line l is above a given overlap threshold (e.g., 0.5). The overlap between two substantially parallel lines is defined as the ratio of the overlapped segment length over the length of the shorter line. FIG. 4 illustrates two substantially parallel lines 320 having a line overlap indicated at 324 and a distance between the lines indicated 322.

2) The line is substantially parallel to the line l. The line is substantially parallel to the line l if the angle α between the lines satisfies: $|\cos \alpha| > t_\alpha$, where $t_\alpha$ is a given angle threshold (e.g., $t_\alpha = 0.995$).

3) The distance of the line to the line l is no greater than the given distance threshold d (e.g., 15). In one example, if more than two such lines are counted in each of the two spaces 302a and 302b, the line l is marked for removal. Once each detected line is analyzed and the cleaning process is complete, the lines marked for removal are removed. FIG. 5A is a diagram illustrating one example of detected lines in an image prior to the clean-up process and FIG. 5B is a diagram illustrating one example of detected lines in the image after the clean-up process. As illustrated by FIGS. 5A and 5B, the number of lines after the clean-up process is reduced.

Combiner 222 receives the scaled line information for the infrared image from scale adjuster 210 and the cleaned line information for the color image from cleaner 220. Combiner 222 combines the scaled line information for the infrared image and the cleaned line information for the color image into a single list of detected lines. In one example, each line may carry a flag of "infrared" or "color" indicating the source image from which the line was detected. Sorter 224 receives the list of lines from combiner 222 and sorts the lines by their length.

Figure 6:
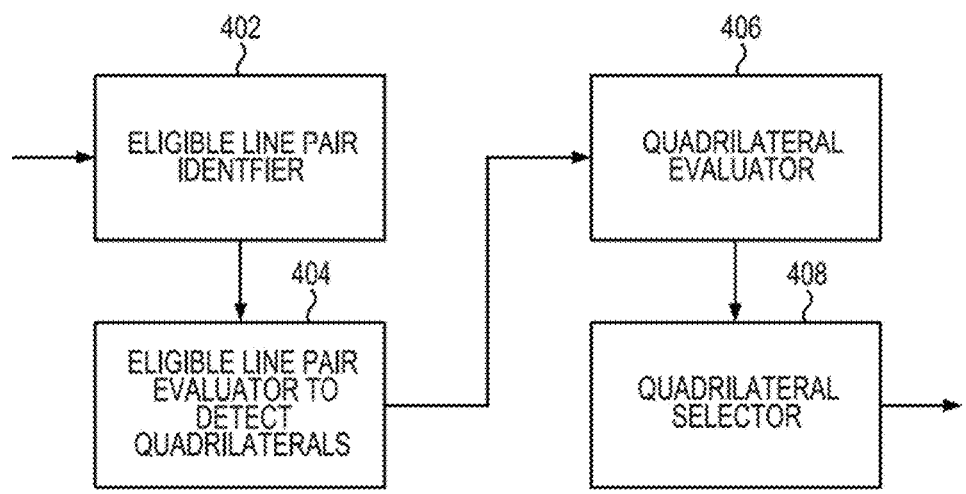
FIG. 6 is a functional block diagram illustrating one example of a document region detection module.

FIG. 6 is a functional block diagram illustrating one example of a document region detection module. In one example, document region detection module 124 (FIG. 1) includes an eligible line pair identifier 402, an eligible line pair evaluator to detect quadrilaterals 404, a quadrilateral evaluator 406, and a quadrilateral selector 408. The document region detection module detects document regions based on the lines detected as previously described above with reference to FIGS. 2-5B. For this example, it is assumed that the documents are completely within the infrared and color images and do not overlap within the images. The documents may be in an arbitrary position within the infrared and color images.

Eligible line pair identifier 402 receives the list of lines from sorter 224 (FIG. 2). Eligible line pair identifier 402 evaluates all possible line pairs according to the following four criteria:

1) The length of each line of the pair exceeds a minimum length $L_{min}$, which is set according to the width width dimension of the image (e.g., $L_{min} = \text{width}/30$).

2) The angle α between the two lines of the pair satisfies: $|\cos \alpha| > t_\alpha$, where $t_\alpha$ is a given angle threshold (e.g., $t_\alpha = 0.995$) to indicate that the two lines are substantially parallel.

3) The overlap between the two lines of the pair exceeds a given overlap threshold. As previously defined above, the overlap between two substantially parallel lines is defined as the ratio of the overlapped segment length over the length of the shorter line. In one example for eligible line pairs, this ratio should be above 0.5.

4) The distance between the two lines of the pair exceeds a given distance threshold. This is determined as the distance from the middle point of one line to the other line.

Line pairs that satisfy the above four criteria are considered for quadrilateral detection and are designated as eligible line pairs.

Eligible line pair evaluator to detect quadrilaterals 404 receives the eligible line pairs from eligible line pair identifier 402. Eligible line pair evaluator to detect quadrilaterals 404 sorts the eligible line pairs of lines i and j according to the value $D_{i,j}$ as follows:

$$D_{i,j}=(d_{i,j}+k*(l_i+l_j))$$

where:

$d_{i,j}$ is the distance between the two lines i and j;

$l_i$ and $l_j$ are the length of lines i and j, respectively; and k is a weighting parameter (e.g., k=0.25).

Every two eligible line pairs are evaluated for quadrilateral detection in the order of $D_{i,j}$. Line pairs having a higher value of D are evaluated prior to line pairs having a lower value of a D. Two line pairs (i.e., four lines) are a candidate for a quadrilateral if they satisfy the following four criteria:

1) No two lines are the same among the four lines.

2) At least one pair of lines is substantially parallel as defined by: $|\cos\alpha|>t'_\alpha$, where $t'_\alpha$ is an angle threshold and $t'_\alpha>t_\alpha$ (e.g., $t'_\alpha=0.9996$).

3) At least two corners (i.e., the intersection of two lines) are substantially right angles as defined by: $|\cos\alpha|<\varepsilon$ where $\varepsilon$ is a small real number. The sum of the corners provides a rightness score rs determined as follows:

$$rs = \sum_{i=0}^{3} (I - |\cos\alpha_i|)$$

where:

$\alpha_i$ is the angle of the corner i.

4) At least one pair of lines is longer than a minimum length (e.g., width/15).

Quadrilateral evaluator 406 receives the candidate quadrilaterals from eligible line pair evaluator to detect quadrilaterals 404 that satisfied the above four criteria. Quadrilateral evaluator 406 performs five further evaluations on each candidate quadrilateral in the following order:

1) For every two pairs of lines that satisfied the above four criteria, a more extensive evaluation is performed to determine scores of the four sides and four corners, as well as the area of the quadrilateral. Each side and each corner is scored with a real number in the range of [0, 1]. If no more than two sides are scored below 0.4, or if the area is smaller than a given threshold (e.g., (width*height)/30), where height is the height of the image, the candidate quadrilateral is rejected.

Figure 10:
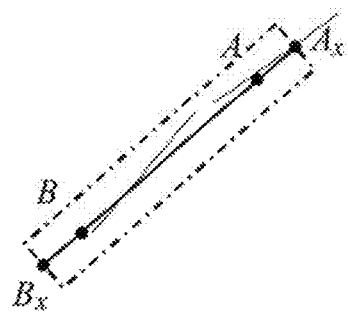
FIG. 10 illustrates one example of a line segment.
Figure 12:
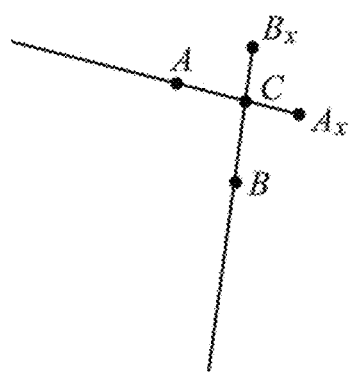
FIG. 12 illustrates one example of a corner.

A side is defined by two points A and B providing a line segment AB as illustrated in FIG. 10, and a corner is defined by two intersecting line segments as illustrated in FIG. 12. An extended line segment $A_xB_x$ defined by two points $A_x$ and $B_x$ includes line segment AB. The length of a segment $AA_x$ from point A to point $A_x$ and the length of a segment $BB_x$ from point B to point $B_x$ are equal and set proportional to the length of AB (e.g., $AA_x=BB_x=AB/6$). Side scores are determined in image coordinates with all distance units in pixels. A side score for a line segment AB may be determined according to the following process:

1.1) An array of integer counters is set up with $[L_{A_xB_x}]$ elements, where [x] is the floor function and $L_{A_xB_x}$ is the length of $A_xB_x$. All counters are initialized to zero.

1.2) The detected line segments are checked to see if they can be projected into $A_xB_x$. A line segment l can be projected into $A_xB_x$ if it meets the following two conditions:

1.2.1) The angle between l and $A_xB_x$ is small enough judging by the cosine value of the angle.

Figure 11:
FIG. 11 illustrates one example of the projection of one line into another line.

1.2.2) The distances from the two end points of l to $A_xB_x$ are smaller than a set value (e.g., 3 pixels). The projection of one line $l_1$ into another line $l_2$ is illustrated in FIG. 11. For every line projected to $A_xB_x$, the corresponding counters within the two ends of the projected line segment are incremented by one.

1.3) The base score $S_0$ for the segment AB is then determined as follows:

$$S_0=N_{AB}/[AB]$$

where:

$N_{AB}$ is the number of non-zero counters in the range of [A, B]; and

[AB] is the integer length of the segment AB.

Any line protected into the extended segments $AA_x$ and $HB_x$ is counted as penalty scores and $P_{AA_x}$ and $P_{BB_x}$, respectively, as follows:

$$P_{AA_x}=N_{AA_x}/[AB] \ P_{BB_x}=N_{BB_x}/[AB]$$

where:

$N_{AA_x}$ and $N_{BB_x}$ are the number of non-zero counters in the range of [A, $A_x$] and [B, $B_x$], respectively.

Finally, the score $S_{AB}$ for the segment AB is determined as follows:

$$S_{AB}=S_0 \cdot (1-\lambda P_{AA_x}) \cdot (1-\lambda P_{BB_x})$$

where:

$\lambda$ is a penalty weight (e.g., $\lambda=0.9$).

To compute a score for a corner, as illustrated in FIG. 12, having an intersection point C between a first line segment $AA_x$ and a second line segment $BB_x$, the base scores for AC and BC are determined, the penalty scores for $A_xC$ and $B_xC$ are determined, and the following is determined:

$$S_{AC}=S_0^{AC} \cdot (1-\lambda P_{A_xC}) \text{ and } S_{BC}=S_0^{BC} \cdot (1-\lambda P_{B_xC})$$

Finally, the corner score $S_C$ is determined as follows:

$$S_C=0.5 \cdot (S_{AC}+S_{BC})$$

Figure 7:
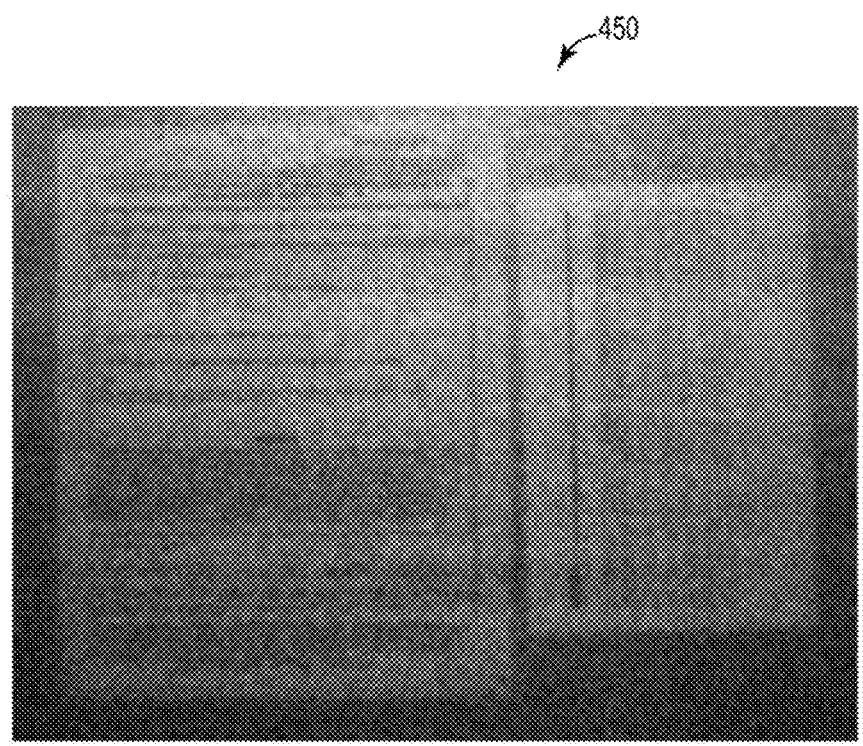
FIG. 7 illustrates one example of an infrared image for hot spot detection.

2) The candidate quadrilateral is then considered for hot spot boost. The "hot spot" is roughly an area in the top center of a captured infrared image, in which the image contrast is significantly low and the noise is high. A document corner or side falling in the hot spot area is often undetectable. An example of such infrared image is shown in FIG. 7. For a system having a fixed configuration, the hot spot area can be determined by experimental observations. Therefore, it can be determined whether a corner or side is affected by the hot spot. If a corner or a side is affected by the hot spot, the scores of the unaffected corners and sides are further checked. If every unaffected corner and side has a score higher than a given threshold (e.g., 0.5), a boost score (e.g., 0.9) is added to the affected corner or side.

3) The candidate quadrilateral is checked for a bad side. A "bad side" is defined as a low score side with two low score corners at both ends. Low score is defined as a score below 0.5. If a candidate quadrilateral contains a bad side, the candidate quadrilateral is rejected.

4) The side scores and corner scores are checked again. In one example, if any one of the side scores is below 0.3, or if any one of the corner scores is below 0.2, the quadrilateral is rejected.

5) The candidate quadrilateral is compared against a set of commonly used document sizes for a possible match. Commonly used document sizes include for example letter size (8.5"×11"), 4"×6" and 3"×5" printed photos, and business cards (2"×3.5"). The match of a length L of a side of the candidate quadrilateral against a nominal length $L_0$ is evaluated by: $|L-L_0|/L_0$. If this value exceeds a given threshold $t_m$ (e.g., $t_m=0.02$) it is considered a mismatch. For matching a quadrilateral against the set of document sizes, the matches of short sides and long sides are checked. If both are a match under the given threshold, a match score $S_m$ is determined as the average of: $1-|L-L_0|/L_0$ of the two sides. $S_m$ is in the range of $[1-t_m,1]$. Furthermore, a boost score is determined as follows: $S_{boost}=k_m \cdot (S_m+1_m-1)$, which is in the range of $[0,k_m \cdot t_m]$, where $k_m$ is a weighting parameter. This boost score is then added to the four corners and the four sides to provide a score up to a maximum of 1.0 for each corner and each side.

For each candidate quadrilateral that passes the five evaluations described above, a metric value m is determined as follows:

$$m = w_0 \cdot A/A_0 + w_i \cdot \sum_{i=0}^{3} cs_i + w_2 \cdot \sum_{i=0}^{3} SS_i + w_3 \cdot rs$$

where:
A is the area of the candidate quadrilateral;
$A_0$ is the area of the image;
cs and ss are the corner and side scores, respectively;
rs is the rightness score of the four corners; and
$\{w_i|_{0 \leq i \leq 3}\}$ is a set of weights (e.g., $\{5.5,1.5,1.3,1.0\}$).

Quadrilateral selector 408 receives the candidate quadrilaterals from quadrilateral evaluator 406 that pass the evaluations performed by quadrilateral evaluator 406. Quadrilateral selector 408 implements the following pseudo code to select non-overlapping quadrilaterals that correspond to document regions.

Initialize pool size for quadrilaterals to N (e.g., 100).
Initialize the number of quadrilaterals in the pool $n_p=0$.

```
While( quad=GetANewQuad( ) ) {
    If( n_p ==0 ) {
        Add quad to the pool.
        Increase n_p by 1.
    }
    Else {
```

Determine overlap of quad with every quadrilateral in the pool. The overlap of two quadrilaterals is determined by the ratio of the overlapped area over the area of the smaller quadrilateral. If this ratio is above a given threshold (e.g., 0.01), the two quadrilaterals are deemed as overlapped.

If the number of overlaps is zero, add the quad to the pool and increase $n_p$ by 1.

If the number of overlaps is one, compare the metric values m of the two overlapped quadrilaterals and only keep the quadrilateral having the higher metric value m in the pool. Do not change $n_p$.

If the number of overlaps is more than one, compare the metric value m of the quad to the highest metric value m of the overlapped quadrilaterals in the pool. If the metric value m of the quad is higher, replace the overlapped quadrilaterals in the pool with the quad, and adjust $n_p$ accordingly.

}
if the quad is accepted into the pool, and if its corner and side scores are higher than a threshold, $$\left( e.g., \left(\sum_{i=0}^{3} cs_i\right) > 3.6 \text{ and } \left(\sum_{i=0}^{3} ss_i\right) > 3.4 \right),$$

flag and skip all line pairs that are completely within this quadrilateral for future quadrilateral detection. This speeds up the whole detection process significantly.
}

After all candidate quadrilaterals have been processed by quadrilateral selector 408, each quadrilateral remaining in the pool corresponds to a document region.

Figure 8:
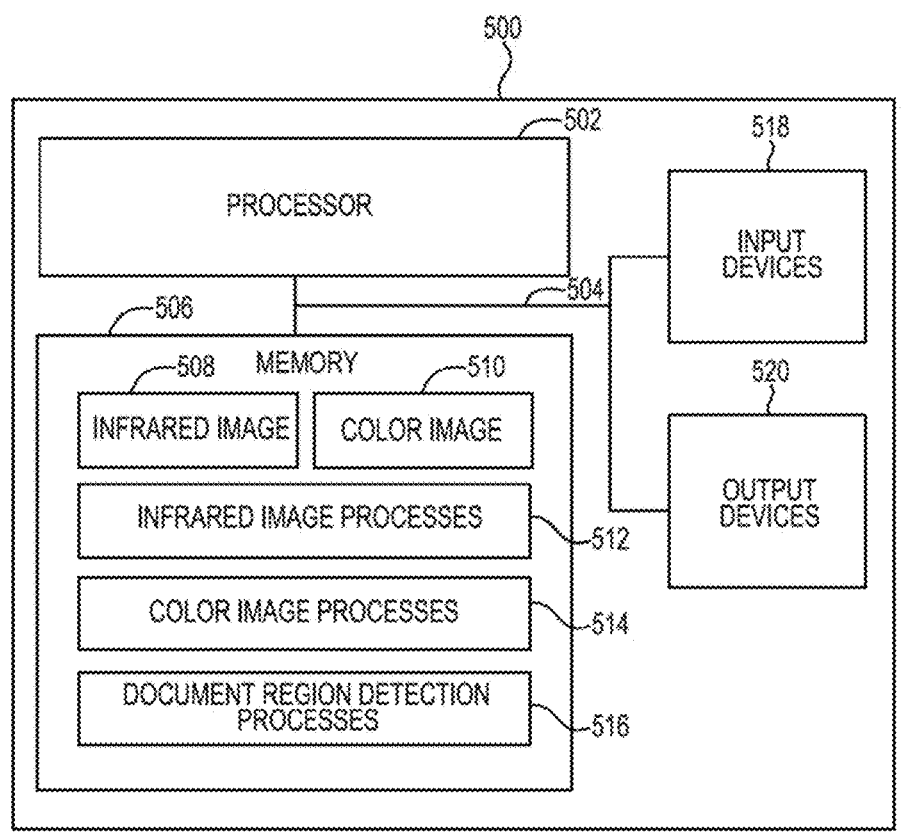
FIG. 8 is a block diagram illustrating one example of a processing system for implementing a document region detection system.

FIG. 8 is a block diagram illustrating one example of a processing system 500 for implementing a document region detection system, such as documents region detection system 110 previously described and illustrated with reference to FIG. 1. Processing system 500 includes a processor 502, a memory 506, input devices 518, and output devices 520. Processor 502, memory 506, input devices 518, and output devices 520 are communicatively coupled to each other through a communication link 504 (e.g., a bus).

Processor 502 includes a Central Processing Unit (CPU) or another suitable processor. In one example, memory 506 stores machine readable instructions executed by processor 502 for operating processing system 500. Memory 506 includes any suitable combination of volatile and/or non-volatile memory, such as combinations of Random Access Memory (RAM), Read-Only Memory (ROM), flash memory, and/or other suitable memory.

Memory 506 stores an infrared image 508 and a color image 510 for processing by processing system 500. Memory 506 also stores instructions to be executed by processor 502 including instructions for infrared image processes 512, color image processes 514, and document region detection processes 516. In one example, infrared image processes 512 implement infrared image processing module 112 (FIG. 1), color image processes 514 implement color image processing module 116 (FIG. 1), and document region detection processes 516 implement combining module 120 (FIG. 1) and document region detection module 124 (FIG. 1).

Input devices 518 include a keyboard, mouse, data ports, and/or other suitable devices for inputting information into processing system 500. In one example, input devices 518 are used to input infrared image 508 and color image 510 into processing system 500. Output devices 520 include a monitor, speakers, data ports, and/or other suitable devices for outputting information from processing system 500. In one example, output devices 520 are used to output document regions identified within the infrared and color images.

Figure 9:
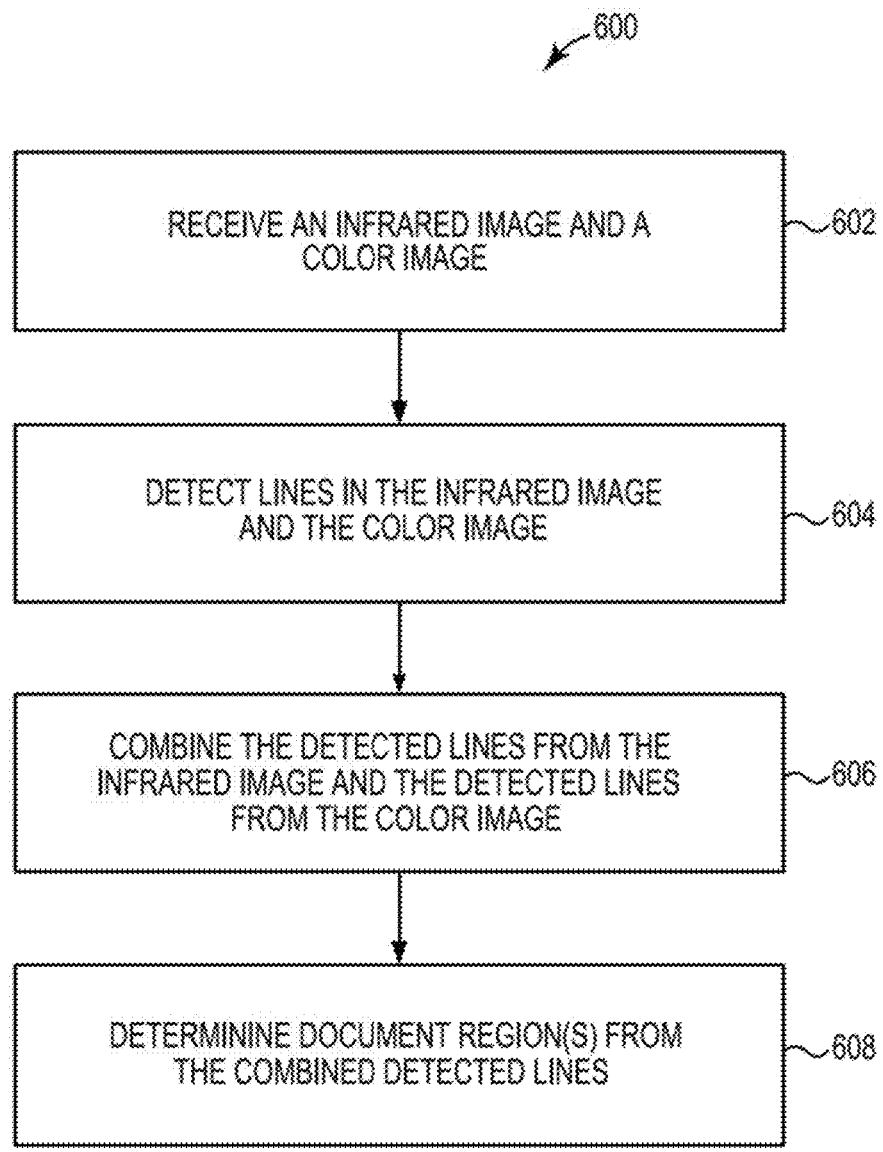
FIG. 9 is a flow diagram illustrating one example of a method for detecting document regions.

FIG. 9 is a flow diagram illustrating one example of a method 600 for detecting document regions. At 602, an infrared image and a color image are received. At 604, lines are detected in the infrared image and in the color image. At 606, the detected lines from the infrared image and the detected lines from the color image are combined. At 608, document regions are determined from the combined detected lines.

In one example, the infrared image is substantially spatially registered with the color image. In one example, detecting lines in the infrared image includes filtering noise from the infrared image, detecting edges in the filtered infrared image, detecting lines based on the detected edges, and scaling the detected lines to the color image. In one example, detecting lines in the color image includes filtering noise from the color image, detecting edges in the filtered color image, detecting lines based on the detected edges, and removing detected lines that fail to meet specified thresholds. In one example, determining the document region from the combined detected lines includes identifying eligible line pairs from the combined detected lines, evaluating the eligible line pairs to detect quadrilaterals, evaluating the quadrilaterals, and determining a document region based on the evaluated quadrilaterals.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a memory communicatively coupled to the processor, the memory storing instructions causing the processor, after execution of the instructions by the processor, to:
  receive an infrared image and process the infrared image to detect lines in the infrared image;
  receive a color image corresponding to the infrared image and process the color image to detect lines in the color image;
  combine the detected lines in the infrared image and the detected line in the color image; and
  detect a document region from the combined detected lines.

2. The system of claim 1, wherein the memory stores instructions causing the processor, after execution of the instructions by the processor, to:
  detect multiple document regions from the combined detected lines.

3. The system of claim 1, wherein detecting a document region comprises:
  determining eligible line pairs from the combined detected lines; and
  identifying non-overlapping quadrilaterals comprising two eligible line pairs.

4. The system of claim 3, wherein determining eligible line pairs comprises identifying line pairs that satisfy each of the following:
  the length of each line exceeds a minimum length;
  the angle between the lines exceeds an angle threshold;
  the overlap between the lines exceeds an overlap threshold; and
  the distance between the lines exceeds a distance threshold.

5. The system of claim 3, wherein identifying non-overlapping quadrilaterals comprises:
  sorting the eligible line pairs based on the distance between the lines and the length of the lines of each eligible line pair;
  identifying two line pairs from the sorted eligible line pairs to determine candidate quadrilaterals; and
  evaluating each candidate quadrilateral to identify non-overlapping quadrilaterals.

6. The system of claim 5, wherein identifying two line pairs from the sorted eligible line pairs comprises identifying two line pairs that satisfy each of the following:
  no two lines are the same among the four lines;
  at least one pair of lines is substantially parallel;
  at least two corners of intersecting lines are substantially right angles; and
  at least one pair of lines is longer than a length threshold.

7. The system of claim 5, wherein evaluating each candidate quadrilateral to identify non-overlapping quadrilaterals comprises:
  assigning a metric value to each candidate quadrilateral based on an area of the candidate quadrilateral, corner scores for the candidate quadrilateral, and side scores for the candidate quadrilateral; and
  identifying non-overlapping quadrilaterals that have the highest metric value.

8. A system comprising:
  an infrared image capture device to capture an infrared image;
  a color image capture device to capture a color image substantially spatially registered with the infrared image;
  an infrared image processing module to detect lines in the infrared image;
  a color image processing module to detect lines in the color image; and
  a document region detection module to detect document regions based on a combination of the detected lines of the infrared image and the detected lines of the color image.

9. The system of claim 8, wherein the infrared image processing module filters noise, detects edges, detects lines, and adjusts the scale of detected lines of the infrared image.

10. The system of claim 8, wherein the color image processing module filters noise, detects edges, detects lines, and cleans the detected lines of the color image.

11. A method comprising:
  receiving an infrared image and a color image;
  detecting lines in the infrared image and the color image;
  combining the detected lines from the infrared image and the detected lines from the color image; and
  determining a document region from the combined detected lines.

12. The method of claim 11, wherein the infrared image is substantially spatially registered with the color image.

13. The method of claim 11, wherein detecting lines in the infrared image comprises:
  filtering noise from the infrared image;
  detecting edges in the filtered infrared image;
  detecting lines based on the detected edges; and
  scaling the detected lines to the color image.

14. The method of claim 11, wherein detecting lines in the color image comprises:
  filtering noise from the color image;
  detecting edges in the filtered color image;
  detecting lines based on the detected edges; and
  removing detected lines that fail to meet specified thresholds.

15. The method of claim 11, wherein determining the document region from the combined detected lines comprises:
  identifying eligible line pairs from the combined detected lines;
  evaluating the eligible line pairs to detect quadrilaterals;
  evaluating the quadrilaterals; and
  determining a document region based on the evaluated quadrilaterals.

* * * * *

UNITED STATES PATENT AND TRADEMARK OFFICE
CERTIFICATE OF CORRECTION

PATENT NO. : 10,002,434 B2
APPLICATION NO. : 15/500573
DATED : June 19, 2018
INVENTOR(S) : Jian Fan et al.

Page 1 of 1

It is certified that error appears in the above-identified patent and that said Letters Patent is hereby corrected as shown below:

In the Drawings

In sheet 4 of 7, FIG. 6, reference numeral 402, Line 2, delete "IDENTFIER" and insert -- IDENTIFIER --, therefor.

In sheet 6 of 7, FIG. 9, reference numeral 608, Line 1, delete "DETERMININE" and insert -- DETERMINE --, therefor.

In the Claims

In Column 9, Line 27 approx., in Claim 1, delete "line" and insert -- lines --, therefor.

Signed and Sealed this
Eleventh Day of December, 2018

Andrei Iancu
*Director of the United States Patent and Trademark Office*